US008604123B1

(12) United States Patent
Weismann et al.

(10) Patent No.: US 8,604,123 B1
(45) Date of Patent: Dec. 10, 2013

(54) BIODEGRADABLE POLYMER COMPOSITION WITH CALCIUM CARBONATE AND METHODS AND PRODUCTS USING SAME

(75) Inventors: Paul Weismann, San Diego, CA (US); Sandee Whiteman, Los Angeles, CA (US); James Lunt, Wayzata, MN (US)

(73) Assignee: C-Stone LLC, San Diego, CA (US)

( * ) Notice: Subject to any disclaimer, the term of this patent is extended or adjusted under 35 U.S.C. 154(b) by 0 days.

(21) Appl. No.: 13/548,024

(22) Filed: Jul. 12, 2012

Related U.S. Application Data

(60) Provisional application No. 61/508,001, filed on Jul. 14, 2011, provisional application No. 60/507,545, filed on Jul. 13, 2011.

(51) Int. Cl.
*C08K 3/20* (2006.01)
*C08K 3/26* (2006.01)
*C08L 67/00* (2006.01)
*B32B 27/36* (2006.01)

(52) U.S. Cl.
USPC ............ 524/539; 524/401; 524/425; 428/220

(58) Field of Classification Search
USPC .......................... 524/539, 401, 425; 428/220
See application file for complete search history.

(56) References Cited

U.S. PATENT DOCUMENTS

| | | | |
|---|---|---|---|
| 5,206,087 A | 4/1993 | Tokiwa et al. | |
| 5,340,646 A | 8/1994 | Morita et al. | |
| 5,358,676 A | 10/1994 | Andersen et al. | |
| 5,385,764 A | 1/1995 | Andersen et al. | |
| 5,405,887 A | 4/1995 | Morita et al. | |
| 5,453,310 A | 9/1995 | Andersen et al. | |
| 5,506,046 A | 4/1996 | Andersen et al. | |
| 5,508,072 A | 4/1996 | Andersen et al. | |
| 5,527,387 A | 6/1996 | Andersen et al. | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,580,409 A | 12/1996 | Andersen et al. | |

(Continued)

FOREIGN PATENT DOCUMENTS

| | | |
|---|---|---|
| JP | 04-146952 | 5/1992 |
| JP | 05-077317 | 3/1993 |

(Continued)

OTHER PUBLICATIONS

International Searching Authority, Notification of Transmittal of the International Search Report and the Written Opinion of the International Searching Authority, or the Declaration for Related Copending PCT Application No. PCT/US2011/020713, Apr. 12, 2011.

(Continued)

*Primary Examiner* — William Cheung
(74) *Attorney, Agent, or Firm* — Knobbe Martens Olson & Bear LLP

(57) ABSTRACT

Described herein are biodegradable compositions, methods for making these compositions, and applications using these compositions. In one embodiment, a process of manufacturing paper or other products is provided using a composition comprising a mixture of calcium carbonate along with a biodegradable biopolymer matrix made from renewable resources including polylactic acid ("PLA"), aliphatic polyesters, and/or aliphatic aromatic polyesters and other additives.

2 Claims, 1 Drawing Sheet

(56) References Cited

U.S. PATENT DOCUMENTS

| | | |
|---|---|---|
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,637,412 A | 6/1997 | Andersen et al. |
| 5,641,584 A | 6/1997 | Andersen et al. |
| 5,654,048 A | 8/1997 | Andersen et al. |
| 5,658,603 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,747,633 A | 5/1998 | Ito et al. |
| 5,753,308 A | 5/1998 | Andersen et al. |
| 5,766,525 A | 6/1998 | Andersen et al. |
| 5,766,748 A | 6/1998 | Ikado et al. |
| 5,776,388 A | 7/1998 | Andersen et al. |
| 5,783,126 A | 7/1998 | Andersen et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,851,634 A | 12/1998 | Andersen et al. |
| 5,868,824 A | 2/1999 | Andersen et al. |
| 5,879,722 A | 3/1999 | Andersen et al. |
| 5,928,741 A | 7/1999 | Andersen et al. |
| 5,976,235 A | 11/1999 | Andersen et al. |
| 6,030,673 A | 2/2000 | Andersen et al. |
| 6,083,586 A | 7/2000 | Andersen et al. |
| 6,085,596 A | 7/2000 | Andersen et al. |
| 6,090,195 A | 7/2000 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,280,680 B1 | 8/2001 | Liang |
| 6,347,934 B1 | 2/2002 | Andersen et al. |
| 6,379,446 B1 | 4/2002 | Andersen et al. |
| 6,494,704 B1 | 12/2002 | Andersen et al. |
| 6,573,340 B1 | 6/2003 | Khemani et al. |
| 6,838,403 B2 | 1/2005 | Tsai et al. |
| RE39,339 E | 10/2006 | Andersen et al. |
| 7,344,784 B2 | 3/2008 | Hodson |
| 7,386,368 B2 | 6/2008 | Andersen et al. |
| 2002/0042599 A1 | 4/2002 | Zhao et al. |
| 2002/0053757 A1 | 5/2002 | Andersen et al. |
| 2002/0094444 A1 | 7/2002 | Nakata et al. |
| 2002/0098341 A1 | 7/2002 | Schiffer et al. |
| 2005/0112350 A1 | 5/2005 | Ning |
| 2005/0112352 A1 | 5/2005 | Laney et al. |
| 2005/0112363 A1 | 5/2005 | Ning |
| 2005/0137304 A1 | 6/2005 | Strand et al. |
| 2006/0240726 A1 | 10/2006 | Hodson |
| 2006/0287773 A1 | 12/2006 | Andersen et al. |
| 2007/0184220 A1 | 8/2007 | Cleveland et al. |
| 2008/0009976 A1 | 1/2008 | Andersen et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0064812 A1 | 3/2008 | Narayan et al. |
| 2008/0066653 A1 | 3/2008 | Andersen et al. |
| 2008/0099122 A1 | 5/2008 | Andersen et al. |
| 2008/0153940 A1 | 6/2008 | Scheer et al. |
| 2008/0281018 A1 | 11/2008 | Seeliger et al. |
| 2008/0286519 A1 | 11/2008 | Nicolson et al. |
| 2009/0012625 A1 | 1/2009 | Ying et al. |
| 2009/0047525 A1 | 2/2009 | Tilton |
| 2009/0191780 A1 | 7/2009 | Schiffer et al. |
| 2009/0286023 A1 | 11/2009 | Dobreski et al. |
| 2009/0324917 A1* | 12/2009 | Wang et al. .................. 428/220 |
| 2010/0048791 A1 | 2/2010 | Vucak et al. |
| 2010/0068484 A1 | 3/2010 | Kaufman |
| 2010/0143738 A1 | 6/2010 | Bloembergen et al. |
| 2011/0172326 A1 | 7/2011 | Weismann et al. |
| 2012/0196950 A1 | 8/2012 | Weismann et al. |

FOREIGN PATENT DOCUMENTS

| | | |
|---|---|---|
| JP | 09-031228 | 2/1997 |
| JP | 09-208817 | 8/1997 |
| JP | 10-219088 | 8/1998 |
| JP | 2007-231154 | 9/2007 |
| WO | WO 2009/131903 | 10/2009 |

OTHER PUBLICATIONS

Natur Tec, Sustainable Biobased Materials, http://www.natur-tec.com/pdf/Natur-Tec_General_Product_Sheet.pdf (c) 2010.

Natur Tec, Sustainable Biobased Materials, http://www.natur-tec.com/pdf/Stock_ProductList.pdf (c) 2010.

Natur Tec, Sustainable Biobased Materials, http://www.natur-tec.com/technology (c) 2010.

* cited by examiner

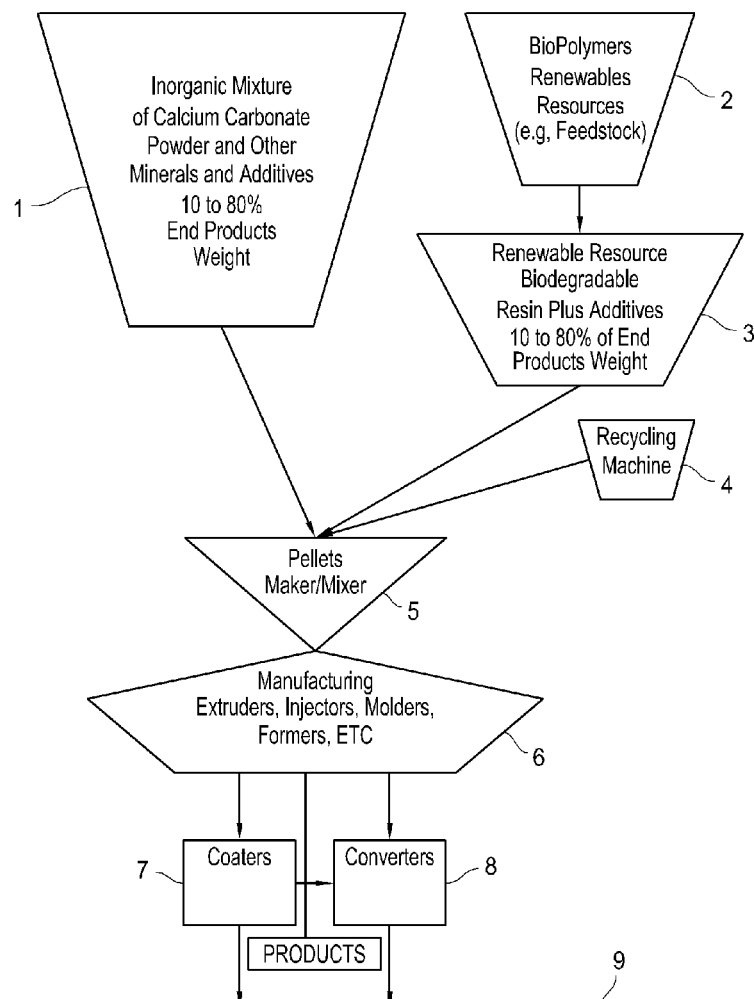

BIODEGRADABLE POLYMER COMPOSITION WITH CALCIUM CARBONATE AND METHODS AND PRODUCTS USING SAME

CROSS-REFERENCE TO RELATED APPLICATIONS

This application claims the benefit of priority under 35 U.S.C. §119(e) of U.S. Provisional Application No. 61/508,001 filed on Jul. 14, 2011, and entitled "BIODEGRADABLE POLYMER COMPOSITION WITH CALCIUM CARBONATE AND METHODS AND PRODUCTS USING SAME" and U.S. Provisional Application No. 61/507,545 filed on Jul. 13, 2011, and entitled "BIODEGRADABLE POLYMER COMPOSITION WITH CALCIUM CARBONATE AND METHODS AND PRODUCTS USING SAME," which are hereby incorporated herein by reference in their entirety and are to be considered a part of this specification.

Further details regarding materials, products and processes of the embodiments of the present application may be found in U.S. application Ser. No. 12/987,963, filed Jan. 10, 2011, entitled "Biodegradable Polymer Composition with Calcium Carbonate and Methods and Products Using Same," published as US 2011/0172326 A1, the entirety of which is hereby incorporated by reference.

BACKGROUND

1. Field

Embodiments of the invention relate generally to biodegradable compositions, methods for making these compositions, and applications using these compositions.

2. Description of the Related Art

Petroleum-based plastics are used routinely in such applications as paper, packaging materials, utensils and cutlery, food containers, as well as many others. More than 400 billion pounds of plastic are produced each year is the U.S. alone, accounting for nearly 10% of total U.S. oil consumption. Such materials are desirable by retailers and consumers because they may be simply disposed of after use and do not need to be washed or reused.

The widespread and growing use of such disposable materials results in a mounting amount of litter produced each day. Plastic litter may either be incinerated or it may accumulate in a refuse dump. More than 60 million plastic petroleum-based water bottles end up in landfills every day. Since these plastics do not decay in soil, landfills, rivers or oceans, these methods of waste disposal have the potential to cause many problems for the environment.

For preparing the above-mentioned items, biodegradable polymers are already known in the art and comprise materials such as poly(glycolic acid), poly(epsilon-caprolactone), PLA, and polydioxanone. The production of these polymers can be cumbersome and expensive, so their use may be restricted to high value applications. Another limitation with polylactic acid specifically is that it lacks the level of heat resistance present in petroleum based plastics, under typical processing conditions used in the industry.

There then exists a demand to provide a composition which is degraded in a natural environment in a time period which is significantly shorter than the amount of time required for the degradation of conventional plastic materials, such as polyethylene, polypropylene, or polystyrene. There also exists a demand to reduce the amount of biodegradable polymer resin that may be cumbersome or expensive to produce.

SUMMARY

In view of the foregoing, there are described herein biodegradable compositions, methods for making these compositions, and applications using these compositions. In certain embodiments, these compositions comprise a mixture of 10% to 80% calcium carbonate by weight based on the total weight of the composition along with a biodegradable biopolymer matrix made with renewable resources. Examples of biodegradable renewable resources include polylactic acid ("PLA"), polyester amides, polycaprolactone, soy proteins, polyhydroxyalkanoate ("PHA"), polyhydroxybutyrate ("PHB"), and/or starch from corn, wheat, tapioca, potatoes, or similar renewable resource products. The polymer matrix may also be made of one or more of polybutylene substrates, biodegradable polyesters, aliphatic polyesters and/or aliphatic aromatic polyesters.

When the desired end product is determined, a mixture of calcium carbonate and other inorganic mineral powders and biodegradable resins and additives are combined in a specific formula for that end use. Manufacturing processes such as melting, coating, stretching, laminating and/or any other such suitable manufacturing process may be used to make the desired end product.

According to one embodiment a biodegradable composition is described that comprises a biodegradable polymer, the biodegradable polymer comprising between about 30% and about 60% by weight of the composition and an inorganic filler comprising calcium carbonate. The calcium carbonate may comprise between about 15% and about 45% by weight of the composition. The between about 15% and about 45% calcium carbonate may comprise about 60% or more calcium carbonate particles having a median particle size of 0.7 microns (or about 0.7 microns) or less, and about 40% or less calcium carbonate particles having a median particle size of 1.4 microns (or about 1.4 microns) or more. In some embodiments, the biodegradable polymer may comprise polylactic acid. In some embodiments, the particles of calcium carbonate are wet ground. The between about 15% and about 45% by weight calcium carbonate may exhibit a bimodal particle size distribution consisting essentially of a first median particle size of 0.8 microns (or about 0.8 microns) or less and a second median particle size of 1.5 microns (or about 1.5 microns) or more. According to some embodiments, the calcium carbonate comprises between about 30% and about 45% by weight of the composition. The biodegradable composition may further comprise talc, the talc comprising up to about 20% by weight of the composition. The biodegradable composition may further comprise ethylene vinyl acetate, the ethylene vinyl acetate comprising up to about 15% by weight of the composition. The biodegradable composition may further comprise titanium dioxide, the titanium dioxide comprising between about 1% and about 2% by weight of the composition. The biodegradable composition may further comprise an aromatic sulfonate derivative, the aromatic sulfonate derivative comprising up to about 2% by weight of the composition.

According to another embodiment, a food service product is disclosed that includes a composition including a biodegradable polymer comprising between about 30% and about 60% by weight of the food service product, an inorganic filler comprising calcium carbonate, the calcium carbonate comprising between about 10% and about 45% by weight of the food service product, talc comprising up to about 20% by weight of the food service product, epoxidized soybean oil comprising up to about 15% by weight of the food service product, a plasticizer comprising up to about 10% by weight of the food service product, and ethylene bis stearamide comprising up to about 20% by weight of the food service product. In some embodiments, the biodegradable polymer may comprise polylactic acid. According to an embodiment, the between about 10% and about 45% calcium carbonate comprises about 60% or more calcium carbonate particles having a median particle size of 0.7 microns (or about 0.7 microns) or less, and about 40% or less calcium carbonate particles having a median particle size of 1.4 microns (or about 1.4 microns) or more. The food service product may further comprise an aromatic sulfonate derivative comprising up to about 2% by weight of the food service product. The food service product may further comprise titanium dioxide comprising between about 1% and about 2% by weight of the food service product.

According to yet another embodiment, a printable sheet is disclosed that includes a composition including a biodegradable polymer comprising between about 30% and about 45% by weight of the printable sheet, an inorganic filler comprising calcium carbonate, the calcium carbonate comprising between about 30% and about 45% by weight of the printable sheet, talc comprising up to about 2% by weight of the printable sheet, an aromatic sulfonate derivative comprising up to about 2% by weight of the printable sheet, epoxidized soybean oil comprising between up to about 15% by weight of the printable sheet, and a plasticizer comprising between about 2% and about 10% by weight of the printable sheet. In some embodiments, the biodegradable polymer may comprise polylactic acid. According to some embodiments, the between about 30% and about 45% calcium carbonate comprises about 55% or more calcium carbonate particles having a median particle size of 0.7 microns (or about 0.7 microns) or less, and about 45% or less calcium carbonate particles having a median particle size of 1.4 microns (or about 1.4 microns) or more. In some embodiments, the printable sheet may further comprise titanium dioxide comprising between about 1% and about 2% by weight of the printable sheet.

A product such as a pellet may be formed by combining the mixture of inorganic mineral powders consisting of primarily calcium carbonate and forming granulates where the inorganic mineral powders comprise 10% to 80% of the total weight of the composition, with 20% to 90% biodegradable renewable resource resin by weight, and optionally from 1% to 30% of other additives by weight, such additives being part of either the mineral powder or other modifiers such as nucleating agents, plasticizers, mold release agents and other modifiers known in the art, by the steps of mixing, extruding, or milling the inorganic mineral powders, the biodegradable renewable resource resin, and the additives. For example, according to an embodiment, a method for making the composition into a paper film consists of using at least one extruder. The biodegradable material composition may be melted in the extruder, molded, and cooled and stretched to the desired product thickness and consistency. The biodegradable material composition may also be subject to applicable coatings, cuttings, and finishing.

The biodegradable material composition may be adjusted for specific end uses which could include similar properties to high density polyethylene (HDPE) plastic products or pulp paper products and may have comparable properties to such products, such as stiffness, opaqueness, foldability, ability to retain ink or graphite from writing utensils, and tearing strength. The biodegradable material composition may also be adjusted for use in such applications as signs, packaging, boxes, food containers, bags, labels, maps, books, newspapers and magazine, trays, credit cards and room keys, architectural drawings, decoration, wall coverings and other similar and non-similar uses. Other foreseeable applications for the composition mixture may include, but are not limited to parts of insulation, moisture barriers, window coverings, office supplies, various specialty containers, as well as any application where the material may be suitable as a substitute for petroleum-based plastics.

An end product made from the composition may be water resistant and may be used for an application requiring waterproofing or water repelling characteristics.

An end product made from the composition may also be manufactured in single, double, triple, and/or additional layers depending on the desired end use. The layers may also be laminated to modify properties and uses. According to some embodiments, layers of the same material may be laminated on the biodegradable composition. According to other embodiments, one or more different materials may be laminated on the composition.

Current similar non wood paper products include HDPE products or resins and are not biodegradable. According to embodiments of the invention, this product may replace the HDPE in plastic products with a biodegradable component.

BRIEF DESCRIPTION OF THE DRAWINGS

FIG. 1 is a schematic view of a process for making and processing a biodegradable polymer composition according to an embodiment of the invention.

DETAILED DESCRIPTION

The following description discloses a new biodegradable material composition and methods for forming the biodegradable material composition. Also, various end products and methods for making those end products comprising a biodegradable material composition are disclosed. The disclosed biodegradable material composition can be incorporated into a variety of end products, including signs, packaging, boxes, food containers, bags, labels, maps, books, newspapers and magazine, trays, credit cards and room keys, architectural drawings, decoration, wall coverings, parts of insulation, moisture barriers, window coverings, office supplies, various specialty containers, as well as any application where the material may be suitable as a substitute for petroleum-based plastics.

According to other embodiments, the composition may comprise renewable biomass. The biomass may be utilized instead of or in addition to biodegradable materials. In some cases, biomass will also be biodegradable. Biomass may include materials such as vegetable oil, corn starch, pea starch, or microbiota. Biomass may also refer to waste products such as wood pulp, corn stover, grasses and the like.

Various processing methods that can be used to create end products with the biodegradable material composition include such materials processing methods as extrusion, thermoforming, injection molding, vacuum forming, blow molding, and rotational molding.

The term "biodegradable material" as used herein pertains to a degradable material in which the degradation process involves the action of naturally occurring microorganisms such as bacteria, fungi, and algae. A degradable material such as a degradable plastic is a plastic designed to undergo a significant change in its chemical structure under specific environmental conditions, resulting in a loss of some properties that may be measured by standard tests methods appropriate to the plastic and the application in a period of time that determines its classification. Depending on the additional components present in the composition and the dimensions of the object made from said biodegradable material, the time period required for degradation will vary and may also be controlled. Generally, the time span for biodegradation will be significantly shorter than the time span required for a degradation of objects made from conventional plastic materials having the same dimensions, such as polyethylene. According to ASTM 6400 D99, a compostable plastic would need to biodegrade within less than 180 days to be classified as such. For example, a PLA-based article would degrade in compost environment in weeks.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

A biodegradable material composition according to an embodiment comprises a biodegradable polymer and an inorganic filler comprising calcium carbonate comprising between 10% and 80% (or about 10% and about 80%) by weight, preferably between 30% and 65% (or about 30% and about 65%) by weight, more preferably between 30% and 50% (or about 30% and about 50%) by weight, of the total weight of the biodegradable composition. The biodegradable polymer may preferably comprise polylactic acid and comprise between 10% and 80% (or about 10% and about 80%) by weight of the end product weight. The composition, according to other embodiments, also contains a starch. In some embodiments, the starch comprises between 10% and 25% (or about 10% and about 25%) by weight. In other embodiments the starch comprises between 15% and 20% (or about 15% and about 20%) by weight. The starch may be derived from such sources as corn, wheat, tapioca, potatoes or similar sources. According to another embodiment, the composition does not include a starch or only includes a trace amount of starch.

Calcium carbonate may be represented by the chemical compound $CaCO_3$ and may be found in nature. According to embodiments of the biodegradable material composition, the addition of the above-described percentages of calcium carbonate may effectively add desirable properties such as increased flexibility, impact resistance, and heat resistance without compromising the structural stability of the material composition.

According to some embodiments, a biodegradable composition may contain between 15% and 45% by weight (or between about 15% and 45% by weight), between 20% and 30% by weight (or between about 20% and 30% by weight), between 25% and 45% by weight (or between about 25% and 45% by weight), between 30% and 45% by weight (or between about 30% and 45% by weight), between 25% and 50% by weight (or between about 25% and 50% by weight), or between 20% and 45% by weight (or between about 20% and 45% by weight) of calcium carbonate, based on the total weight of the composition.

Calcium carbonate may be treated before it is added to the biodegradable material composition. For example, according to an embodiment, the calcium carbonate may be treated with a surface treatment to enhance dispersion and adhesion to a matrix polymer. The treatment may comprise any suitable treatment, including stearic acid to assist in formation of the material. In another embodiment, the calcium carbonate used may combine both wet ground and dry ground calcium carbonate, for example, in a ratio of 1:1 (or about 1:1). Calcium carbonate may also be combined with magnesium carbonate or other suitable materials to comprise an inorganic filler, for example 1 to 3 wt. % (or about 1 to about 3 wt. %), more preferably 2 wt. % (or about 2 wt. %) magnesium carbonate based on the total weight of inorganic filler added.

According to an embodiment, for example when the calcium carbonate is provided in powdered form, the calcium carbonate comprises particles with a controlled particle size distribution. The particles of calcium carbonate may be relatively or substantially spherical. According to another embodiment, the particles of calcium carbonate may be ovular or round. In one embodiment, the calcium carbonate particles may have a specific surface area of $3.3 \text{ m}^2/\text{g}$ to $9.5 \text{ m}^2/\text{g}$ (or about $3.3 \text{ m}^2/\text{g}$ to about $9.5 \text{ m}^2/\text{g}$).

The calcium carbonate when added to the biodegradable material composition will exhibit a particle size distribution, for example, between 0.2 microns and 10 microns (or about 0.2 to about 10 microns). A median particle size is the size of particle below which 50% of the particles fall by weight. The median particle size may also be referred to as the median particle diameter. The particle size distribution according to this embodiment may have a median particle size of 2 microns (or about 2 microns) or less, 1.5 microns (or about 1.5 microns) or less, 1 micron (or about 1 micron) or less, 0.8 microns (or about 0.8 microns) or less, or 0.5 microns (or about 0.5 microns) or less.

According to another embodiment, the calcium carbonate utilized may exhibit a bimodal particle size distribution. In yet another embodiment, a combination of at least two samples of calcium carbonate particles having two distinct median particle sizes may be mixed together to comprise the calcium carbonate of the biodegradable material composition. In this embodiment, the particle size distribution may exhibit a first median particle size of 2 microns (or about 2 microns) or less, 1.5 microns (or about 1.5 microns) or less, 1 micron (or about 1 micron) or less, or 0.8 microns (or about 0.8 microns or less)or less, and exhibit a second median particle size of 1 micron (or about 1 micron) or more, 1.5 microns (or about 1.5 microns) or more, 2 microns (or about 2 microns) or more, or 3 microns (or about 3 microns) or more. According to some embodiments a different percentage by weight of the first sample and the second sample of calcium carbonate may be combined to comprise the calcium carbonate of the biodegradable material composition. According to another embodiment, the same percentage by weight of the first sample and the second sample of calcium carbonate may be combined to comprise the calcium carbonate of the biodegradable material composition. According to one embodiment, a mixture of calcium carbonate is formed that comprises 60% (or about 60%) or more by weight of a first sample of calcium carbonate having a median particle size of 2 microns (or about 2 microns) or more, combined with 40% (or about 40%) or less by weight of a second sample of calcium carbonate having a median particle size of 0.5 microns (or about 0.5 microns) or less. According to another embodiment, a mixture of calcium carbonate is formed that comprises 75% (or about 75%) or more by weight of a first sample of calcium carbonate having a median particle size of 1.5 microns (or about 1.5 microns) or more, combined with 25% (or about 25%) or less by weight of a second sample of calcium carbonate having a median particle size of 0.5 microns (or about 0.5 microns) or less. Selection of the particle size of the calcium carbonate, and for example the use of two distinct particle size distributions of two different samples of calcium carbonate, may contribute to the packing of the calcium carbonate particles in the biodegradable material composition.

According to yet another embodiment, a mixture of calcium carbonate is formed that contains 50% (or about 50%) or more, 55% (or about 55%) or more, 60% (or about 60%), or 65% (or about 65%) or more by weight of a first sample of calcium carbonate having a median particle size of 0.7 microns (or about 0.7 microns) or less, combined with 50% (or about 50%) or less, 45% (or about 45%) or less, 40% (or about 40%) or less, or 35% (or about 35%) or less by weight, respectively, of a second sample of calcium carbonate having a median particle size of 1.4 microns (or about 1.4 microns) or more. In one embodiment, the mixture of calcium carbonate comprises about 67% by weight of the first sample of calcium carbonate having a median particle size of 0.7 microns (or about 0.7 microns) or less combined with about 33% or less by weight of the second sample of calcium carbonate having a median particle size of 1.4 microns (or about 1.4 microns) or more. In another embodiment, the mixture of calcium carbonate is formed that contains about 58% by weight of the first sample of calcium carbonate having a median particle size of 0.7 microns (or about 0.7 microns) or less combined with about 42% by weight of the second sample of calcium carbonate having a median particle size of 1.4 microns (or about 1.4 microns) or more.

According to one embodiment, about 25% by weight of Omyacarb® UFT-FL ultrafine wet ground calcium carbonate obtained from Omya Inc. having a median particle size of 0.7 microns was combined with about 75% by weight of Omyacarb® 2 SS T-SY fine wet ground calcium carbonate obtained from Omya Inc. having a median particle size of 2.0 microns. Both Omyacarb® UFT-FL and 2 SS T-SY are surface treated with stearic acid. The Omyacarb® UFT-FL includes 98% calcium carbonate, 1% magnesium carbonate, and 1.1% surface treatment including stearic acid. This material has a Y Brightness of 95.5, 7 ppm retained on 325 mesh, and a moisture loss of 0.05% at 110° C. The material has a Hegman value of 5.5, a specific gravity of 2.7, and a mean refractive index of 1.57. In addition to the median particle size of 0.7 microns, the material has a $D_{90}$ of 2 microns, a $D_{65}$ of 1 micron, and a specific surface area of 9.5 m$^2$/g. The Omyacarb® 2 SS T-SY includes 98% calcium carbonate, 2% magnesium carbonate, and 0.8% surface treatment including stearic acid. This material has a Y Brightness of 97, 1 ppm retained on 325 mesh, and a moisture loss of 0.03% at 110° C. The material has a specific gravity of 2.7 and a mean refractive index of 1.57. In addition to the median particle size of 2.0 microns, the material has a top cut of 10 microns and a specific surface area of 3.3 m$^2$/g.

A biodegradable polymer resin for the biodegradable material composition may comprise PLA, soy proteins, PHAs, or any other suitable biodegradable polymer, preferably PLA. PLA is a thermoplastic aliphatic polyester that may be derived from renewable resources. PLA is beneficial, in part, because it can be composted. PLA can be prepared according to any method known in the state of the art. For example, PLA can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D-, and L-lactic acid), and racemic D,L-lactide. Preferably the PLA may have a number average molecular weight of 70,000 to 120,000 and an overall D content between 1 and 10%. One such PLA may include Ingeo™ Biopolymer 3251D from NatureWorks LLC having a specific gravity of 1.24, a relative viscosity of 2.5, a crystalline melt temperature of 155-170° C. and a glass transition temperature of 55-60° C. Another such PLA may comprise Ingeo™ Biopolymer 4032D from NatureWorks LLC having a MD tensile strength of 15 kpsi, a MD tensile modulus of 500 kpsi, and a 180% MD elongation at break. Yet another such PLA may comprise Ingeo™ Biopolymer 2003D from NatureWorks LLC having a tensile strength of 53 MPa, a tensile yield strength of 60 MPa, and a tensile elongation of 6.0%.

According to an embodiment, PLA may comprise between 25% by weight and 65% by weight (or between about 25% by weight and about 65% by weight) of a biodegradable material composition, based on the total weight of the biodegradable material composition. In some embodiments, the PLA may comprise between 25% and 45% (or between about 25% and about 45%) by weight of the composition. In other embodiments, the PLA may comprise between 50% and 65% (or between about 50% and 65%) by weight of the composition.

In some embodiments, some or all of the biodegradable polymer used in the biodegradable composition may include any compostable polyester, polyester amide, aliphatic polyester or aliphatic aromatic polyester. Aliphatic polyesters may include PHA, PLA, polybutylene succinate (PBS), and/or any other aliphatic polyester known to those of skill in the art. According to an embodiment, one or more of compostable polyesteramides, polyester, aliphatic polyester or aliphatic aromatic polyester may comprise between 25% by weight and 65% by weight (or between about 25% by weight and about 65% by weight) of a biodegradable material composition, based on the total weight of the biodegradable material composition. In some embodiments, one or more of a compostable polyesteramides, polyester, aliphatic polyester or aliphatic aromatic polyester may comprise between 25% and 45% (or between about 25% and about 45%) by weight of the composition. In other embodiments, one or more of a compostable polyesteramides, polyester, aliphatic polyester or aliphatic aromatic polyester may comprise between 50% and 65% (or between about 50% and 65%) by weight of the composition.

According to an embodiment, the biodegradable material composition comprising PLA and 10% to 80% by weight of the composition of calcium carbonate (or other compositions described above) may advantageously show only a slight reduction in molecular weight of the PLA during typical melt processing as evidenced by the ability to satisfactorily process the compositions and the ultimate mechanical performance. If significant melt degradation had occurred the melt flow would be too high to provide for satisfactory processing and mechanical properties would be adversely affected. The biodegradable material composition may also advantageously shows an increase in biodegradation rate as compared to other mineral fillers known in the art.

The composition, according to other embodiments, may also contain a starch. The starch may be derived from such sources as corn, wheat, tapioca, potatoes or similar sources. In some embodiments, the biodegradable composition does not contain starch, or only contains a negligible amount of starch.

Other additives may be added to the biodegradable composition to affect the properties of the composition. Types of additives that may be added include, but are not limited to, plasticizers, flow modifiers, branching agents, binders, and/or other minerals. According to an embodiment, additives may comprise between 0.5% and 30% (or about 0.5% and about 30%), the total weight of the composition. In some embodiments, the additives may comprise between 1% and 2% (or between about 1% and about 2%) by weight of the composition. In other embodiments, the additives may comprise between 20% and 30% (or between about 20% and 30%) by weight of the composition. In yet other embodiments, the additives may comprise between 10% and 30% (or between about 10% and 30%) by weight of the composition.

According to yet another embodiment, the composition may comprise tuff (sometimes referred to as tufa). Tuff is a type of rock comprising consolidated volcanic ash. According to an embodiment, tuff may be ground to a desired particle size, and replace part or all of the calcium carbonate in the biodegradable composition. Tuff may comprise amounts of sodium, silicon and aluminum. Different particle sizes of tuff may be incorporated into the composition. Tuff may comprise between 10% and 50% (or between about 10% and about 50%) by weight of the composition.

One additive that may be used in the composition is talc. Talc is a mineral composed of magnesium silicate, but it may instead contain amounts of silicon dioxide, magnesium oxide, calcium oxide, aluminum oxide, and Iron. Talc may be added to the composition to assist in the crystallization of an end product, which may improve heat resistance. Talc is an inorganic mineral that may replace some or all of the calcium carbonate in the biodegradable composition. In certain grades of PLA, talc may act as a nucleating agent. According to an embodiment, the talc may be processed to have a median particle size of less than or equal to about 1.0 micron. According to one embodiment, ground talc obtained from Specialty Minerals may be used in a biodegradable composition, the talc having a median particle size of less than 0.9 microns, a specific gravity of 2.8, a dry brightness of 89, a bulk density of 0.10 grams/cc, a tapped density of 0.32 grams/cc, a pH of 8.8, and a Hegman Fineness of 7. In some embodiments, the talc utilized in a biodegradable composition may comprise a unimodal particle size distribution. In other embodiments, the talc may comprise a bimodal particle size distribution. In yet other embodiments, the distribution of particle sizes may be random. In unimodal systems, the median particle size of talc may be less or equal to one micron. Talc may exhibit such beneficial properties in the composition such as increased heat resistance and improved crystallization. Talc may comprise between 0% and 20% (or about 0% and about 20%), preferably between 0% and 17% (or about 0% and about 17%) of the total weight of the composition. According to some embodiments, a biodegradable composition may contain 2% (or about 2%) by weight, 5% (or about 5%) by weight, or 10% by weight (or about 10%) by weight of talc, based on the total weight of the composition. According to some embodiments, a biodegradable composition may contain up to 2% (or about 2%) by weight, up to 5% (or about 5%) by weight, or up to 10% by weight (or about 10%) by weight of talc, based on the total weight of the composition.

Another crystallizing agent that may be added to the composition is ethylene bis stearamide ("EBSV"). Ethylene bis stearamide may comprise between 0% and 20% (or about 0% and about 20%), preferably between 0% and 17% (or about 0% and about 17%). In some embodiments, ethylene bis stearamide may comprise between 0.4% and 0.6% (or about 0.4% and about 0.6%) of the total weight of the composition. According to some embodiments, a biodegradable composition may contain 5% (or about 5%) by weight, 10% (or about 10%) by weight, or 15% by weight (or about 15%) by weight of EBSV, based on the total weight of the composition. According to some embodiments, a biodegradable composition may contain up to 5% (or about 5%) by weight, up to 10% (or about 10%) by weight, or up to 15% by weight (or about 15%) by weight of EBSV, based on the total weight of the composition.

Other materials that may replace some or all of the calcium carbonate in the biodegradable composition may comprise a filler including, but not limited to mica, glass fibers, natural fibers, silicate fillers, zinc oxide, magnesium oxide, or any other filler used in the industry. Any of the materials may comprise between 10% and 50% (or between about 10% and about 50%) by weight of the composition.

Another additive may be a plasticizer. A plasticizer may increase the flexibility of a final product of the biodegradable composition. The plasticizer may comprise typical plasticizers known in the art, e.g. di octyl adipate ("DOA"). Other potential plasticizers include one or more of: glycerol, sorbitol, castor oil derivatives, triacetin, triethyl citrate, acetyl triethyl citrate, tributyl citrate, acetyl tributyl citrate, trioctyl citrate, acetyl trioctyl citrate, trihexyl citrate, butyryl trihexyl citrate, trimethyl citrate, alkyl sulphonic acid phenyl ester, and 1,2-cyclohexane dicarboxylic acid diisononyl ester. In one embodiment, the biodegradable composition comprises the biodegradable aliphatic-aromatic polyester Ecoflex® P BX 7011 or 7020 provided by BASF as a flexibilizer that has a melting point in the range of 110-120° C. Another suitable flexibilizer may comprise Lapol®, a viscous liquid based on lactic acid. Lapol may achieve 100% elongation with 5%-10% loading. According to some embodiments, a biodegradable composition may contain 5% (or about 5%) by weight, 10% (or about 10%) by weight, or 15% by weight (or about 15%) by weight of a flexibilizer, based on the total weight of the composition. According to some embodiments, a biodegradable composition may contain up to 5% (or about 5%) by weight, up to 10% (or about 10%) by weight, or up to 15% by weight (or about 15%) by weight of a flexibilizer, based on the total weight of the composition.

Yet another plasticizer may comprise the DOA Plasthall® provided by Hallstar that has an acid value of 0.04 mg KOH/g, a refractive index of 1.4457 at 25° C., a specific gravity of 0.924 at 25° C., and a saponification value of 303. The plasticizer may comprise between 0% and 20% (or about 0% and about 20%), preferably between 0% and 10% (or about 0% and about 10%) of the total weight of the composition. According to some embodiments, a biodegradable composition may contain 5% (or about 5%) by weight, 10% (or about 10%) by weight, or 15% by weight (or about 15%) by weight of a plasticizer, based on the total weight of the composition. According to some embodiments, a biodegradable composition may contain up to 5% (or about 5%) by weight, up to 10% (or about 10%) by weight, or up to 15% by weight (or about 15%) by weight of a plasticizer, based on the total weight of the composition.

Yet another plasticizer may comprise an epoxidized soybean oil ("ESO"). The epoxidized soybean oil may increase the melt strength of the biodegradable composition and may function as a plasticizer. According to one embodiment, an epoxidized soybean oil Paraplex® G-62 obtained from Hallstar may be used in a biodegradable composition having an acid value of 0.11 mg KOH/g, a refractive index of 1.4695 at 25° C., a specific gravity of 0.992 at 25° C., and a viscosity of 407 cps at 25° C. The epoxidized soybean oil may comprise between 0% and 20% (or about 0% and about 20%), preferably between 0% and 15% (or about 0% and about 15%) of the total weight of the composition. According to some embodiments, a biodegradable composition may contain 2% (or about 2%) by weight, 5% (or about 5%) by weight, or 8% by weight (or about 8%) by weight of ESO, based on the total weight of the composition. According to some embodiments, a biodegradable composition may contain up to 2% (or about 2%) by weight, up to 5% (or about 5%) by weight, or up to 8% by weight (or about 8%) by weight of ESO, based on the total weight of the composition.

Yet another additive may comprise an organic nucleating agent or mold release agent such as ethylene bis stearamide. In addition, an aromatic sulfonate derivative may act as a crystallizing agent. According to one embodiment, an aromatic sulfonate derivative LAK-301 G-62 may be obtained from Takemoto Oil & Fat Co., LTD. The aromatic sulfonate derivative may comprise between 0% and 5% (or about 0% and about 5%), preferably between 0% and 2% (or about 0% and about 2%) of the total weight of the composition. According to some embodiments, a biodegradable composition may contain 1% (or about 1%) by weight, 2% (or about 2%) by weight, or 5% by weight (or about 5%) by weight of an aromatic sulfonate derivative, based on the total weight of the composition. According to some embodiments, a biodegradable composition may contain up to 1% (or about 1%) by weight, up to 2% (or about 2%) by weight, or up to 5% by weight (or about 5%) by weight of an aromatic sulfonate derivative, based on the total weight of the composition.

An anti-blocking agent may be added to the composition to prevent undesired adhesion to a mold or undesired adhesion between layers of formed material. An example of an anti-blocking agent may be an ethylene bis stearamide such as EBSV, available commercially as Crodamide™ from Croda Polymers. According to some embodiments, a biodegradable composition may contain 0.3% (or about 0.3%) by weight, 0.6% (or about 0.6%) by weight, or 1% by weight (or about 1%) by weight of an anti-blocking agent, based on the total weight of the composition. According to some embodiments, a biodegradable composition may contain up to 0.3% (or about 0.3%) by weight, up to 0.6% (or about 0.6%) by weight, or up to 1% by weight (or about 1%) by weight of an anti-blocking agent, based on the total weight of the composition.

Yet another additive may comprise ethylene vinyl acetate ("EVA"). The EVA may comprise between 0% and 10% (or about 0% and about 10%), preferably between 0% and 5% (or about 0% and about 5%) of the total weight of the composition. According to some embodiments, a biodegradable composition may contain 10% (or about 10%) by weight, 15% (or about 15%) by weight, or 20% by weight (or about 20%) by weight of EVA, based on the total weight of the composition. According to some embodiments, a biodegradable composition may contain up to 10% (or about 10%) by weight, up to 15% (or about 15%) by weight, or up to 20% by weight (or about 20%) by weight of EVA, based on the total weight of the composition.

Another additive may comprise titanium dioxide or titanium dioxide pigment. The titanium dioxide, if included in the composition, may comprise between 2% and 50% (or about 2% and about 50%), preferably between 2% and 10% (or about 2% and about 10%) of the total weight of the composition According to some embodiments, a biodegradable composition may contain 1% (or about 1%) by weight, 2% (or about 2%) by weight, or 5% by weight (or about 5%) by weight of titanium dioxide, based on the total weight of the composition. According to some embodiments, a biodegradable composition may contain up to 1% (or about 1%) by weight, up to 2% (or about 2%) by weight, or up to 5% by weight (or about 5%) by weight of titanium dioxide, based on the total weight of the composition.

Yet another additive may comprise polybutylene adipate or polybutylene succinate. The polybutylene adipate, if included in the composition, may comprise between 2% and 50% (or about 2% and about 50%), preferably between 2% and 10% (or about 2% and about 10%) of the total weight of the composition The composition, and particularly the selection of calcium carbonate as described above, may lead to many desirable properties. For example the composition after it is formed and processed may exhibit a heat resistance of 150° F. to 250° F., preferably 180° F. to 250° F.

A composition according to embodiments of the invention may be obtained by mixing or blending the respective components of the biodegradable composition in the desired amounts. They may be performed according to any method known by a person of skill in the art. According to a preferred embodiment, PLA starting materials may be obtained from Natureworks LLC or any PLA supplier or distributor. Suitable grades of PLA may be found at Natureworks' website at http://www.natureworksllc.com/technical-resources.aspx. Biodegradable starch-based compounded resins are also available from Cereplast.

For a detailed understanding of an embodiment the method of making the composition of the disclosure, reference is made to the flow diagram in FIG. 1. As shown in 1, an inorganic mixture of calcium carbonate powder and other minerals and additives is formed. Biopolymer renewable resource 2 comprises a biodegradable polymer such as PLA. As illustrated in 3, the biopolymer resin is mixed with additives. The contents of 1 and 3 are mixed together in pellet maker/mixer 5 to form a biodegradable material composition. The pellet maker/mixer may be equipped with the ability to pelletize the material and may include, for example, a Banbury® mixer and a single screw or twin screw extruder. The mixing may take place in any suitable process, including heating the polymer component so that it flows, then thoroughly mixing in the other components such that all components are evenly dispersed within the biopolymer. The biodegradable material composition may be formed into pellets. Such pellets may be die cut or strand cut with a size range typically from 2-3 mm (or about 2 to about 3 mm).

According to another embodiment of making the composition of the disclosure, a sheet good of the composition may be co-extruded using a suitable extruder capable of extruding multiple layers. According to this embodiment, pellets of the biodegradable composition are heated and run through a vented extruder open to the desired thickness which is also controlled by how the extruded sheets are run through the process. Once through the vent, the sheet is advanced to a chilled roller or chiller that cools the hot sheet. The sheet may then be crystallized if certain materials which act as crystallizing agents such as talc or ethylene bis stearamide are included in the composition to aid crystallization and if the sheet is cooled in a controlled manner after it exits the die.

The above method may be performed by heating the cooling rollers to the appropriate temperature for a specific composition where the rollers heat and crystallize the material to improve the heat resistance of the end product. This temperature is hot enough so that the composition sufficient flows, but is not so hot that the material sticks to rollers or damages the final look and results of the resulting extruded sheet product. The roll temperature may not exceed 60° C., preferably 50° C. According to an embodiment, the outer layer or layers of a multiple layer sheet may contain more additives to aid in crystallization than the interior layer or layers. The outer layer or layers may include up to 10% more crystallization additives. The outer layers may comprise PLA alone, or they may comprise a mixture of PLA and other additives to improve the surface look and feel of the extruded product.

The pellets may be processed according to any suitable processing methods including extrusion forming, injection molding, thermoforming, vacuum forming, injection molding, stretching, blow molding, extrusion, blow molding, and rotational molding or any other processing method known in the art 6. Optionally, the converted products may also undergo a coating process 7 and/or a further processing to form the final article. Such further processing may include plasma coating, metallization, dip coating, and/or any other secondary processes such as laminating heat sealing, ultrasonic welding or other typical secondary processes 8. Coating processes may include coating of the biodegradable composition with additional materials including, but not limited to polyvinyl alcohol, PLA, biopolyesters, acrylics, or any other suitable material. Through the process described above, the biodegradable material composition may be made into numerous end products as illustrated in 9.

The contents of the biodegradable material composition may be selected to achieve a variety of end products with desired properties. For example, a percentage of calcium carbonate between 30% and 60% (or about 30% and about 60%) by weight of the composition with the particle sizes described above may be suitable for paper or paper-like applications. According to another embodiment, a percentage of calcium carbonate between 10% and 45% (or about 10% and about 45%) by weight, of the composition with the particle sizes described above may be suitable for food service product applications, which may include plastic cutlery (including forks, knives, spoons and sporks), cups, plates, bowls, and similar types of products. Other applications for the biodegradable material composition may include signs, packaging, boxes, food containers, bags, labels, maps, books, newspapers and magazine, trays, credit cards and room keys, architectural drawings, decoration, wall coverings, parts of insulation, moisture barriers, window coverings, office supplies, spiral binders, bottles, jars, various specialty containers, cups, medical uses, packaging of feminine hygiene products, sunglasses, soap wrapping, desk accessories, toys, cellular phone covers, films, as well as any application where the material may be suitable as a substitute for petroleum-based plastics.

Some suitable processing methods for processing the biodegradable material composition include, but are not limited to:

Plastics Extrusion, where a biodegradable material composition is melted and formed into a continuous profile, such as, for example, pipe/tubing, weather stripping, window frames, adhesive tape and wire insulation.

Thermoforming, where sheets of the biodegradable material composition are heated to a pliable forming temperature and formed to a specific shape in a mold, and trimmed to create a usable product. This primarily produces disposable cups, containers, lids, trays, blisters, clamshells, and other products for the food, medical, and general retail industries.

Vacuum Forming, which may be used for parts that are shallow in depth or where wall thickness is not critical to the function of the part, such as for transparent materials, unit doses of pharmaceuticals, or protective covers.

Blow Molding, where hot biodegradable material composition resin is pressurized into mold cavities, cooled and hardened, then ejected from the mold. This method may provide a wide variety of industrial or technical applications, such as toy wheels, automobile seat backs, ductwork, surf boards, bellows, fuel tanks, flower pots, automobile bumpers, double-walled tool cases, and cabinet panels.

Rotational Molding, which is similar to blow molding, but molds are slowly rotated into place continuously while cooling. Products that may be produced by this method may include storage tanks, bins and refuse containers, doll parts, road cones, footballs, helmets, rowing boats and kayak hulls, playground slides, and roofs.

In one embodiment, compositions used to make cutlery such as forks, spoons and knives may comprise between 30% and 60% (or between about 30% and about 60%) by weight PLA, 0 to 20% (or between about 0% and about 20%) by weight talc, 10 to 45% (or between about 10% and about 45%) by weight calcium carbonate, 0 to 15% (or between about 0% and about 15%) by weight ESO, 0 to 10% by weight (or between about 0% and about 10%) by weight plasticizer such as polyester or DOA, 0 to 2% by weight (or between about 0% and about 2%) by weight aromatic sulfonate derivative such as LAK 301, and 0 to 5% (or between about 0% and about 5%) by weight EVA. More specific examples for cutlery are provided below as examples one through ten.

In another embodiment, compositions used to make cutlery such as forks, spoons and knives may comprise between 50% and 60% (or between about 50% and about 60%) by weight PLA, between 0% and 10% (or between about 0% and about 10%) by weight talc, between 15% and 30% (or between about 15% and about 30%) by weight calcium carbonate, between 1% and 7% (or between about 1% and about 7%) by weight ESO, between 1% and 7% by weight (or between about 1% and about 7%) by weight plasticizer such as Lapol, between 0% and 1% by weight (or between about 0% and about 1%) by weight aromatic sulfonate derivative such as LAK 301, and 0 to 5% (or between about 0% and about 5%) by weight EVA.

According to a first example a sample of biodegradable composition is provided including 18% by weight of wet ground calcium carbonate having two particle sizes—a first median particle size of 2 microns and a second median particle size of 0.7 microns as described above, 56% by weight of PLA, 16% by weight of talc, 4% by weight of ESO, and 6% by weight of a plasticizer such as polyester or other plasticizers as described above. The wet ground calcium carbonate may contain about 60% or more calcium carbonate particles having a median particle size of about 0.7 microns or less, and about 40% or less calcium carbonate particles having a median particle size of about 1.4 microns or more.

According to a second example a sample of biodegradable composition is provided including 44% by weight of wet ground calcium carbonate having two particle sizes—a first median particle size of 2 microns and a second median particle size of 0.7 microns as described above, 33% by of weight of PLA, 13% by weight of ESO, 5% by weight of plasticizer such as polyester, and 5% by weight of EVA.

According to a third example a sample of biodegradable composition is provided including 18% by weight of wet ground calcium carbonate having a median particle size of 2 microns as described above, 56% by weight of PLA, 16% by weight of talc, 4% by weight of ESO, and 6% by weight of a plasticizer such as polyester.

According to a fourth example a sample of biodegradable composition is provided including 44% by weight of wet ground calcium carbonate having two particle sizes—a first median particle size of 2 microns and a second median particle size of 0.7 microns as described above, 33% by of weight of PLA, 13% by weight of ESO, 5% by weight of plasticizer such as polyester, and 5% by weight of EVA. An extruded product of this composition may be coextruded onto a sheet or thermoformed product to improve surface look and feel.

According to a fifth example a sample of biodegradable composition is provided including 24% by weight of wet ground calcium carbonate having two particle sizes—a first median particle size of 2 microns and a second median particle size of 0.7 microns as described above, 55% by of weight of PLA, 10% by weight of talc, 10% by weight of a plasticizer such as DOA, and 1% by weight of ASD.

According to a sixth example a sample of biodegradable composition is provided including 79% by of weight of PLA, 10% by weight of talc, 10% by weight of a plasticizer such as DOA, and 1% by weight of ASD.

According to a seventh example a sample of biodegradable composition is provided including 10% by weight of wet ground calcium carbonate having a median particle size of 2 microns as described above, 79% by weight of PLA, 10% by weight of a plasticizer such as DOA, and 1% by weight of ASD.

According to an eighth example a sample of biodegradable composition is provided including 44% by weight of wet ground calcium carbonate having a median particle size of 2 microns as described above, 6% by weight of talc, 33% by weight of PLA, 10% by weight of DOA, 6% by weight of a plasticizer such as polyester, and 1% by weight of ASD. This composition may be used in such applications as cutlery and the like.

According to a ninth example a sample of biodegradable composition is provided including 30% by weight of wet ground calcium carbonate having two particle sizes—a first median particle size of 0.7 microns and a second median particle size of 1.4 microns, 58.4% by of weight of PLA, 5% by weight of a plasticizer such as Lapol, 5% by weight ESO, 0.6% by weight EBSV, and 1% by weight of titanium dioxide. The wet ground calcium carbonate having two particle sizes may comprise a mixture that contains about 67% of a wet ground calcium carbonate having a median particle size of 0.7 microns and about 33% of a wet ground calcium carbonate having a median particle size of 1.4 microns.

According to a tenth example a sample of biodegradable composition is provided including 20% by weight of wet ground calcium carbonate having two particle sizes—a first median particle size of 0.7 microns and a second median particle size of 1.4 microns, 58% by of weight of PLA, 10% by weight of talc, 5% by weight of a plasticizer such as Lapol, 5% by weight ESO, 1% by weight of a nucleating agent such as LAK-301, and 1% by weight of titanium dioxide. The wet ground calcium carbonate having two particle sizes may comprise a mixture that contains about 75% of a wet ground calcium carbonate having a median particle size of 0.7 microns and about 25% of a wet ground calcium carbonate having a median particle size of 1.4 microns.

In another embodiment, compositions used to make biopapers comprise 30% to 45% (or about 30% to about 45%) by weight PLA, 30% to 45% (or about 30% to about 45%) by weight calcium carbonate, 0% to 2% (or about 0% to about 2%) by weight talc, 10% to 15% (or about 10% to about 15%) by weight ESO, 2% to 10% (or about 2% to about 10%) by weight plasticizer such as polyester, and 1% to 2% (or about 1% to about 2%) by weight titanium dioxide pigment. The wet ground calcium carbonate may contain about 55% or more calcium carbonate particles having a median particle size of about 0.7 microns or less, and about 45% or less calcium carbonate particles having a median particle size of about 1.4 microns or more. In another embodiment, the calcium carbonate used in a composition used to make biopapers may contain all or substantially all of wet ground calcium carbonate having a single median particle size. More specific examples for biopaper are provided below as examples eleven through twelve.

According to an eleventh example a sample of biodegradable composition is provided including 43% by weight of wet ground calcium carbonate having two particle sizes—a first median particle size of 0.7 microns and a second median particle size of 1.4 microns, 30% by of weight of PLA, 5% by weight of a plasticizer such as Lapol, 1% by weight of a nucleating agent such as LAK-301, 5% by weight ESO, 14% by weight of EVA, and 2% by weight of titanium dioxide. The wet ground calcium carbonate having two particle sizes may comprise a mixture that contains about 58% of a wet ground calcium carbonate having a median particle size of 0.7 microns and about 42% of a wet ground calcium carbonate having a median particle size of 1.4 microns.

According to a twelfth example a sample of biodegradable composition is provided including 22% by weight of wet ground calcium carbonate having a single median particle size of 1.4 microns, 10% by weight of talc, 41% by of weight of PLA, 5% by weight of a plasticizer such as Lapol, 1% by weight of a nucleating agent such as LAK-301, 5% by weight ESO, 14% by weight of EVA, and 2% by weight of titanium dioxide.

The foregoing description of the invention includes preferred forms thereof. Modifications may be made thereto without departing from the scope of the invention. To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

What is claimed is:

1. A printable sheet comprising:
   a biodegradable polylactic acid polymer comprising between about 30% and about 45% by weight of the printable sheet;
   an inorganic filler comprising calcium carbonate, the calcium carbonate comprising between about 30% and about 45% by weight of the printable sheet;
   talc comprising up to about 10% by weight of the printable sheet;
   titanium dioxide comprising between about 1% and about 2% by weight of the printable sheet;
   an aromatic sulfonate derivative comprising up to about 2% by weight of the printable sheet;
   epoxidized soybean oil comprising between up to about 15% by weight of the printable sheet; and
   a plasticizer comprising between about 2% and about 10% by weight of the printable sheet.

2. The printable sheet of claim 1, wherein the between about 30% and about 45% calcium carbonate comprises about 55% or more calcium carbonate particles having a median particle size of about 0.7 microns or less, and about 45% or less calcium carbonate particles having a median particle size of about 1.4 microns or more.

* * * * *